US008653155B2

(12) United States Patent
Ippoliti et al.

(10) Patent No.: US 8,653,155 B2
(45) Date of Patent: Feb. 18, 2014

(54) POLYMERS HAVING LIPOPHILIC HYDROCARBON AND BIODEGRADABLE POLYMERIC SEGMENTS

(75) Inventors: J. Thomas Ippoliti, St. Paul, MN (US); Joshua Speros, St. Paul, MN (US); Scott Schewe, Eden Prairie, MN (US); Robert W. Warner, Woodbury, MN (US); Dan Everson, Rochester, NY (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 295 days.

(21) Appl. No.: 12/855,573

(22) Filed: Aug. 12, 2010

(65) Prior Publication Data

US 2011/0166249 A1 Jul. 7, 2011

Related U.S. Application Data

(60) Provisional application No. 61/233,779, filed on Aug. 13, 2009.

(51) Int. Cl.
| | | |
|---|---|---|
| A61F 2/02 | (2006.01) | |
| A61F 2/82 | (2013.01) | |
| A61F 2/50 | (2006.01) | |
| A61L 24/00 | (2006.01) | |
| A61L 26/00 | (2006.01) | |

(52) U.S. Cl.
USPC ............ 523/113; 523/118; 424/426; 528/354

(58) Field of Classification Search
USPC .................... 523/113, 118; 528/354; 424/426
See application file for complete search history.

(56) References Cited

U.S. PATENT DOCUMENTS

| 3,294,837 | A | 12/1966 | Thompson |
| 5,371,176 | A | 12/1994 | Bezwasa |
| 6,509,440 | B1 | 1/2003 | Sakane |
| 7,351,772 | B2 * | 4/2008 | Yano et al. ..................... 525/412 |
| 7,449,510 | B2 * | 11/2008 | Ueda et al. ..................... 524/442 |
| 8,158,391 | B2 * | 4/2012 | Gross et al. ..................... 435/134 |
| 2007/0224234 | A1 | 9/2007 | Steckel et al. |
| 2008/0160062 | A1 | 7/2008 | Richard |
| 2009/0074838 | A1 | 3/2009 | Sikes et al. |
| 2009/0076595 | A1 | 3/2009 | Lindquist et al. |

FOREIGN PATENT DOCUMENTS

| EP | 2065421 A1 | 6/2009 |
| JP | 2005307108 | 11/2005 |
| JP | 2005307108 A | 11/2005 |

OTHER PUBLICATIONS

Offeman et al., Extraction of ethanol with higher alcohol solvents and their toxicity to yeast, Separation and Purification Technology 63 (2008) 444-451, Elsevier.*
Hao et al., "Preparation and Crystallization Kinetics of New Structurally Well-Defined Star-Shaped Biodegradable Poly (L-lactide)s Initiated with Diverse Natural Sugar Alcohols", Biomacromolecules 2005, 6, pp. 2236-2247.
Jensen et al., "Zinc N-heterocyclic carbene complexes and their polymerization of D,L-lactide", Journal of Organometallic Chemistry 690 (2005) pp. 5881-5891.
Jia et al., "Enzymatic synthesis of galactosyl lactic ethyl ester and its polymer for use as biomaterials", Journal of Biotechnology 132 (2007) pp. 314-317.
Nagasaki et al., "Sugar-Installed Block Copolymer Micelles: Their Preparation and Specific Interaction with Lectin Molecules", Biomacromolecules, vol. 2, No. 4, 2001, pp. 1067-1070.

* cited by examiner

Primary Examiner — Tae H Yoon
(74) Attorney, Agent, or Firm — Mayer & Williams PC; David B. Bonham

(57) ABSTRACT

The present invention pertains, among other things, to polymers having one or more lipophilic hydrocarbon segments and one or more biodegradable polymeric segments, to methods of making such polymers and to products formed using such polymers.

21 Claims, No Drawings

POLYMERS HAVING LIPOPHILIC HYDROCARBON AND BIODEGRADABLE POLYMERIC SEGMENTS

RELATED APPLICATIONS

This application claims priority from U.S. provisional application 61/233,779, filed Aug. 13, 2009, which is incorporated by reference herein in its entirety.

FIELD OF THE INVENTION

The present invention relates, among other things, to polymers having lipophilic hydrocarbon and biodegradable polymeric segments, to methods of making such polymers, and to articles formed using such polymers.

BACKGROUND OF THE INVENTION

Polymers are an important class of molecules that have numerous commercial applications. Biodegradable polymers are a particularly desirable group of polymers which have been used in a wide range of medical and non-medical applications.

SUMMARY OF THE INVENTION

The present invention pertains, among other things, to polymers having one or more lipophilic hydrocarbon segments and one or more biodegradable polymeric segments, to methods of making such polymers and to products formed using such polymers.

These and other aspects and embodiments as well as various advantages of the present invention will become readily apparent to those of ordinary skill in the art upon review of the Detailed Description and Claims to follow.

DETAILED DESCRIPTION

A more complete understanding of the present invention is available by reference to the following detailed description of numerous aspects and embodiments of the invention. The detailed description of the invention which follows is intended to illustrate but not limit the invention.

As is well known, "polymers" are molecules that contain multiple copies (e.g., from 2 to 5 to 10 to 25 to 50 to 100 to 250 to 500 to 1000 or more copies) of one or more constitutional units, commonly referred to as monomers. As used herein, the term "monomers" may refer to free monomers and to those that have been incorporated into polymers, with the distinction being clear from the context in which the term is used.

Polymers may take on a number of configurations, including linear, cyclic and branched configurations, among others. Branched configurations include star-shaped configurations (e.g., configurations in which three or more chains emanate from a hub region), comb configurations (e.g., configurations having a main chain and a plurality of side chains, also referred to as "graft" configurations) and dendritic configurations (e.g., arborescent and hyperbranched polymers), among various others.

Polymers include homopolymers and copolymers. As used herein, "homopolymers" are polymers that contain multiple copies of a single constitutional unit (i.e., monomer), whereas "copolymers" are polymers that contain multiple copies of at least two dissimilar constitutional units.

Polymers in accordance with the present disclosure comprise one or more lipophilic hydrocarbon segments and one or more biodegradable polymeric segments. As used herein, a "segment" is a portion of a molecule. In certain embodiments, the polymers of the present disclosure are fully biodegradable and metabolizable.

The biodegradable polymeric segments are polymeric in nature and contain multiple copies (e.g., from 2 to 5 to 10 to 25 to 50 to 100 or more copies) of a single type of constitutional unit (also referred to herein as a "homopolymeric segment") or multiple copies of each of two or more types of constitutional units (also referred to herein as "copolymeric segments") which may be present, for example, in a random, statistical, gradient, or periodic (e.g., alternating) distribution, among others.

The biodegradable polymeric segments of the present disclosure are preferably polyester, polycarbonate and/or poly (ester-co-carbonate) segments, more preferably those comprising one or more of the following monomers: lactide, glycolide, epsilon-caprolactone, and trimethylene carbonate among others.

Polymers in accordance with the present disclosure can have 1, 2, 3, 4, 5 or more biodegradable polymeric segments. Biodegradable polymeric segment length can vary widely and can range, for example, from 2 to 1000 monomers in length, for example, from 2 to 5 to 10 to 15 to 20 to 25 to 50 to 100 to 250 to 500 to 1000 monomers in length.

As defined herein a "hydrocarbon" segment is a segment that contains hydrogen and carbon atoms, and in some cases only hydrogen and carbon atoms. As defined herein, a "lipophilic" hydrocarbon segment is a hydrocarbon segment that contains five or more carbon atoms, typically ten or more carbon atoms. For example, the lipophilic hydrocarbon segments in the polymers of the present disclosure may contain 5 or more carbon atoms, typically 10 or more (e.g., 10 to 15 to 20 to 25 to 30 to 40 or more) carbon atoms. The lipophilic hydrocarbon segments may be, for example, linear, branched (e.g., containing 1, 2, 3, 4, 5, 7, 10 or more branch points) or cyclic (including polycyclic), and they may be saturated or unsaturated (i.e., containing one or more carbon-carbon double and/or triple bonds). Polymers in accordance with the present disclosure may have 1, 2, 3, 4, 5 or more lipophilic hydrocarbon segments.

In some aspects, polymers in accordance with the present disclosure may be synthesized from species comprising one or more lipophilic hydrocarbon segments, for example, from species comprising one or more lipophilic hydrocarbon segments and one or more groups that act as initiation sites for the biodegradable polymeric segment(s).

For instance, species comprising one or more lipophilic hydrocarbon segments and one or more hydroxyl groups may be employed, wherein the one or more hydroxyl groups act as initiation sites for the ring opening polymerization of one or more cyclic monomers, typically in the presence of a suitable ring opening catalyst, for example, a tin compound such as stannous chloride ($SnCl_2$), stannous octoate (also known as tin(II) 2-ethylhexanoate), or a variety of organic catalysts such as amino thiocarbonyls or diamines.

Examples of cyclic monomers that can be used in such ring opening polymerization reactions include those formed from lactic acid (e.g., lactide, a cyclic ester dimer formed from two lactic acid monomers), functional lactides such as 3,6-bis (benzyloxymethyl)-1,4-dioxane-2,5-dione, glycolic acid (e.g., glycolide, a cyclic ester dimer formed from two glycolic acid monomers), epsilon-caprolactone (a six carbon ester monomer) and trimethylene carbonate (a four carbon carbonate monomer). Further examples of monomers include cyclic dimers, trimers, etc. containing two or more of the forgoing (e.g., cyclic lactic acid-glycolide acid, cyclic lactic acid-epsilon caprolactone, cyclic lactic acid-trimethylene carbonate, cyclic glycolic acid-epsilon caprolactone, cyclic glycolic acid-trimethylene carbonate, cyclic epsilon caprolactone-trimethylene carbonate, cyclic lactic acid-glycolide acid-epsilon caprolactone, cyclic lactic acid-glycolic acid-trimethylene carbonate, etc.).

In embodiments where a species comprising one or more lipophilic hydrocarbon segments and one or more hydroxyl groups is used as an initiator in a ring opening synthesis scheme, the resulting polymers will comprise a residue of such a species. For example, the polymers may comprise a residue of a hydroxyl containing species selected from fatty alcohols, sterols and mono- and di-glycerides, among others.

Typical examples of fatty alcohols include C10 to C50 (e.g., C10 to C15 to C20 to C25 to C30 to C40 to C50) fatty alcohols, which may be linear or branched, saturated or unsaturated, monofunctional or multifunctional.

Specific examples of fatty alcohols include linear saturated fatty alcohols, for example, C10 to C34 saturated fatty alcohols such as those to follow, among others: 1-decanol (capric alcohol), 1-undecanol, 1-dodecanol (lauryl alcohol), 1-tridecanol, 1-tetradecanol (myristyl alcohol), 1-pentadecanol, 1-hexadecanol (cetyl alcohol), 1-heptadecanol (margaryl alcohol), 1-octadecanol (stearyl alcohol), 1-nonadecanol, 1-eicosanol (arachidyl alcohol), 1-heneicosanol, 1-docosanol (behenyl alcohol), 1-tricosanol, 1-tetracosanol (lignoceryl alcohol), 1-pentacosanol, 1-hexacosanol (ceryl alcohol), 1-heptacosanol, 1-octasanol (montanyl alcohol), 1-nonacosanol, 1-tricontanol (myricyl alcohol), 1-hentriacontanol (melissyl alcohol), 1-dotriacontanol (lacceryl alcohol), 1-tritriacontanol and 1-tetratriacontanol (geddyl alcohol).

Specific examples of fatty alcohols further include linear unsaturated fatty alcohols such as C10 to C30 unsaturated fatty alcohols, for instance, selected from the following, among others: 10-undecen-1-ol, (Z)-9-octadecen-1-ol (oleyl alcohol), (E)-9-octadecen-1-ol (elaidyl alcohol), (Z,Z)-9,12-octadecadien-1-ol (linoleyl alcohol), (Z,Z,Z)-9,12,15-octadecatrien-1-ol (linolenyl alcohol), (Z)-13-docosen-1-ol erucyl alcohol, (E)-13-docosen-1-ol brassidyl alcohol.

Further specific examples of fatty alcohols include branched alcohols (which may be saturated or may contain unsaturation), for example, C10-C45 branched fatty alcohols such as those selected from the following, among others: 2-propyl-heptanol, 2-butyl-1-octanol, 2-pentyl-1-nonanol, 2-hexyl-1-decanol, 2-heptyl-1-undecanol, 2-octyl-1-dodecanol, 2-nonyl-1-tridecanol, 2-decyl-tetradecanol, 2-undecyl-1-pentadecanol, 2-dodecyl-hexadecanol, 2-tridecyl-heptadecanol, 2-tetradecyl-1-octadecanol, 2-pentadecyl-1-nonadecanol, 2-hexadecyl-1-eicosanol, 2-heptadecyl-1-heneicosanol, 2-octadecyl-1-docosanol, 2-nonadecyl-1-tricosanol, 2-eicosyl-tetracosanol.

One example of a preferred branched fatty alcohol is Iso-Stearyl Alcohol FO-180 a C18 biocompatible branched fatty alcohol available from Nissan Chemical Industries, Ltd. For example, the following is an illustration of a novel reaction scheme in accordance with the present disclosure (where n is an integer) in which the hydroxyl group of iso-stearyl alcohol FO-180 is used as initiation sites for ring opening polymerization of lactide:

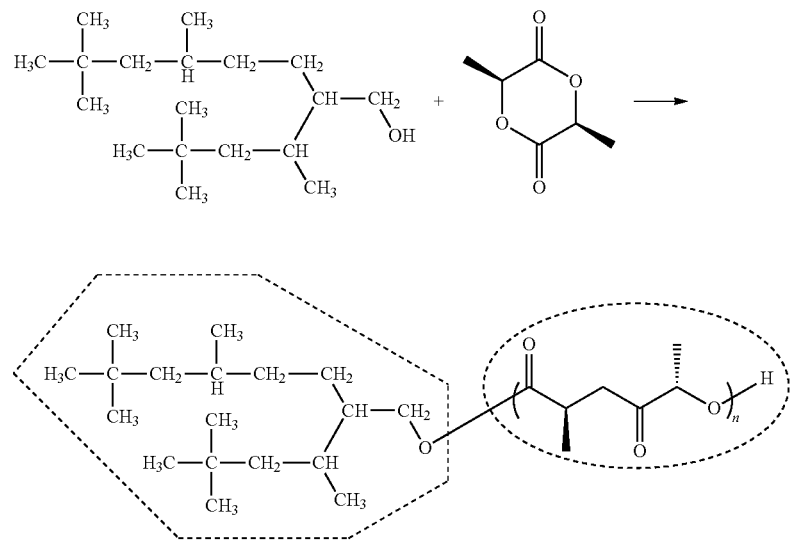

The resulting polymer comprises a fatty alcohol reside (i.e., the original alcohol minus the hydrogen atom of the hydroxyl group), which is designated by the polygonal dashed line. The lipophilic hydrocarbon segment of the polymer (containing only hydrogen and carbon atoms) corresponds to the fatty alcohol residue minus the oxygen atom. The polymer also comprises a biodegradable polymeric segment which is designated by the oval dashed line. Note that the FO-180 contains 8 pendant methyl groups and is relatively highly branched with five branch points. Fatty alcohols containing 1, 2, 3, 4, 5, 7, 10 or more branch points may be employed in the present disclosure.

Further specific examples of fatty alcohols include C10 to C30 (e.g., C10 to C15 to C20 to C25 to C30) multifunctional alcohols (which may be saturated or unsaturated, linear or branched), for example, selected from the following C10-C25 diols, among others: 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20- eicosanediol, 1,21-heneicosanediol, 1,22-docosanediol, 1,23-tricosanediol, 1,24-tetracosanediol, 1,25-pentacosanediol and (Z)-9-octadecene.

Examples of sterols include various phytosterols and zoosterols, for example, cholesterol, 7-dehydrocholesterol, ergosterol, campesterol, lanosterol, desmosterol, lumisterol, tachysterol, stigmasterol, β-sitosterol, asterosterol, aplysterol, avenasterol, brassicasterol, verongulasterol and gorgosterol, and sterol glycosides (e.g., glucosides of β-sitosterol) including acylated sterol glycosides and sulfated sterol glycosides.

Other examples of hydroxyl containing species which can be employed as initiators (and whose residues may thus be found in the polymers of the present disclosure) include reaction products of a polyol and one or more fatty acids.

Examples of polyols from which such hydroxyl containing species can be formed include polyols having two, three, four, five, six or more carbon atoms and two, three, four, five, six or more hydroxyl groups, specific examples of which include glycerol, sorbitol, maltitol, mannitol, xylitol, erythritol, isomalt, lactitol and cyclodextrins, among others.

Typical examples of fatty acids from which such hydroxyl containing species can be formed include C10 to C30 saturated and unsaturated fatty acids, which may and linear or branched. Specific examples include the following C12-C24 saturated fatty acids, among others: lauric acid, myristic acid, palmitic acid, stearic acid, arachidic acid, lignoceric acid. Examples of fatty acids further include the following C14-C26 unsaturated fatty acids, among others: myristoleic acid, palmitoleic acid, oleic acid, linoleic acid, linolenic acid, arachidonic acid, eicosapentaenoic acid, erucic acid, docosahexaenoic acid.

In some embodiments, mono- and di-glycerides of one or more of the foregoing fatty acids are preferred as initiators. In these embodiments, the resulting polymer will either contain one lipophilic hydrocarbon segment and two biodegradable polymeric segments (with a monoglyceride) or two lipophilic hydrocarbon segments and one biodegradable polymeric segment (with a diglyceride). As noted below, the size and relative number (2:1 or 1:2 in the case of mono- and di-glyerides) of the lipophilic hydrocarbon segments and biodegradable polymeric segments can be varied to tune biodegradation and other properties for these polymers.

The following is an illustration of a novel reaction scheme in accordance with the present disclosure in which the two hydroxyl groups of a monoglyceride (glycerol α-monopalmitate) are used as initiation sites for ring opening polymerization of lactide:

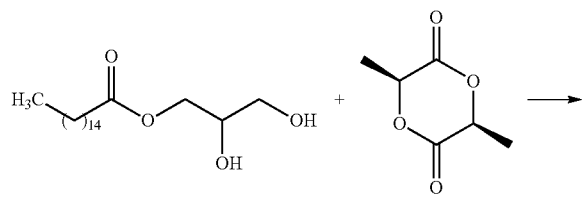

-continued

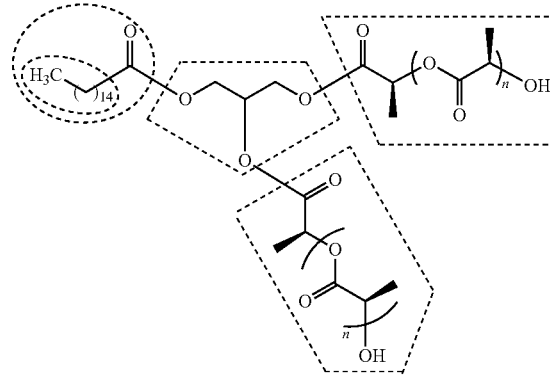

The smaller oval dashed line designates a lipophilic hydrocarbon segment of the polymer (containing only hydrogen and carbon atoms), the larger oval dashed line designates a fatty acid residue (the fatty acid residue corresponds to the original fatty acid minus the terminal —OH of the carboxyl group), the central dashed pentagon designates a glycerol residue (the original alcohol minus the hydrogen atoms associated with the hydroxyl groups), and the remaining two dashed polygons designate biodegradable polymeric segments. The biodegradation products of the preceding polymer are fatty acid (in this case, palmitic acid, one of the most common saturated fatty acids found in animals and plants), polyol (in this case, glycerol, which can be converted in the liver into glucose via dihydroxyacetone phosphate and glyceraldehyde-3-phosphate by way of gluconeogenesis) and monomer (in this case, lactic acid, which can be removed, for example, by oxidation to pyruvate and directly used to fuel the citric acid cycle or converted to glucose via the Cori cycle in the liver through the process of gluconeogenesis).

From the foregoing, it can be seen that polymers in accordance with the present disclosure are capable of being broken down into (a) one or more monomers (e.g., lactic acid, glycolic acid, 6-hydroxyhexanoic acid, etc.), (b) one or more species that comprise a lipophilic hydrocarbon segment (e.g., fatty alcohols, which may be saturated or unsaturated, linear or branched, monofunctional or multifunctional, sterols, sterol glycosides, sulfated sterol glycosides, fatty acids, which may be saturated or unsaturated, linear or branched, for example, palmitic acid, etc.) and (c) in some cases; one or more additional species such as a polyol having two, three, four, five, six or more carbon atoms and two, three, four, five, six or more hydroxyl groups (e.g., glycerol, sorbitol, maltitol, mannitol, xylitol, erythritol, isomalt, lactitol, etc.).

As another example; the following is an illustration of a novel reaction scheme in accordance with the present disclosure in which the one hydroxyl group of a diglyceride (glycerol dipalminate) is used as an initiation site for ring opening polymerization of lactide:

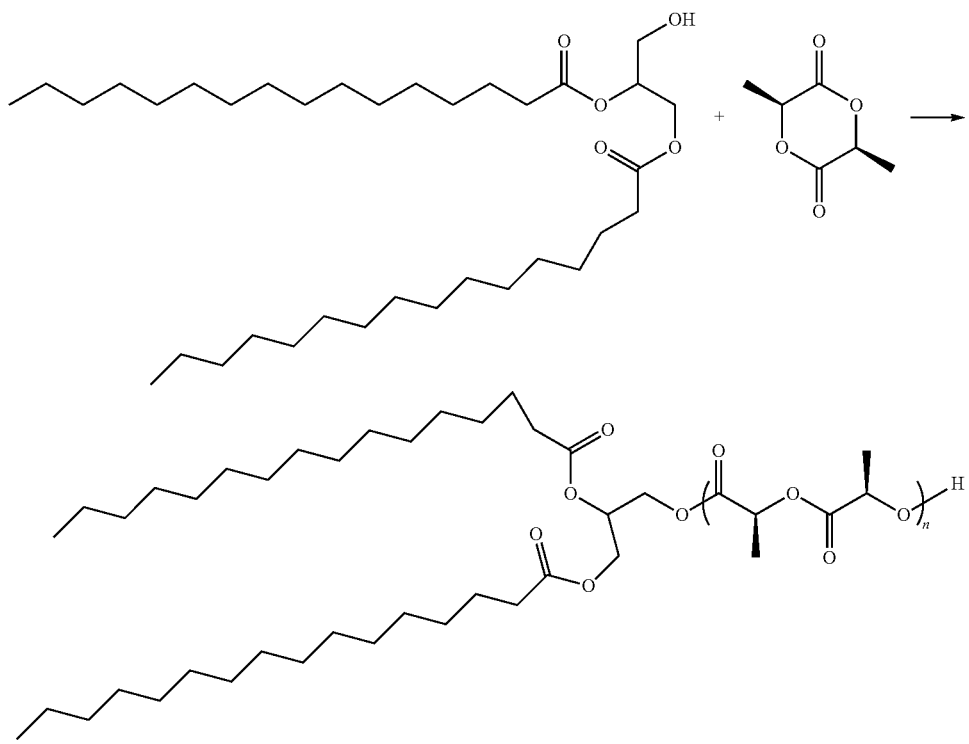

Typically, polymers in accordance with the present disclosure comprise from 5 to 95 wt % lipophilic hydrocarbon segments (e.g., from 5 to 10 to 20 to 30 to 40 to 50 to 60 to 70 to 80 to 90 to 95 wt % lipophilic hydrocarbon segments) and from 95 to 5 wt % biodegradable polymeric segments (e.g., from 95 to 90 to 80 to 70 to 60 to 50 to 40 to 30 to 20 to 10 to 5 wt % biodegradable polymeric segments).

One motivation for providing the polymers of the present disclosure with one or more lipophilic hydrocarbon segments is to increase the hydrophobicity of the polymer, relative to the hydrophobicity that the biodegradable polymeric segment(s) would have in the absence of the lipophilic hydrocarbon segments. Among other effects, this increase in hydrophobicity may slow the degradation rate of the biodegradable polymer.

In this regard, the novel polymers of the present disclosure can be tuned to have differing degrees of hydrophobicity, for example, (a) by altering the number of lipophilic hydrocarbon segments in the polymer, (b) by altering the number of carbons in the lipophilic hydrocarbon segment(s), (c) by altering the number of biodegradable polymeric segments in the polymer, and/or (d) by altering the number of monomer units in the biodegradable polymeric segment(s).

For example, the time required to degrade polymers in accordance with the present disclosure can be increased by increasing the hydrophobicity of the polymer, for instance, (a) by increasing the number of lipophilic hydrocarbon segments in the polymer, (b) by increasing the number of carbons in the lipophilic hydrocarbon segment(s), (c) by decreasing the number of biodegradable polymeric segments in the polymer, and/or (d) by decreasing the number of monomer units in the biodegradable polymeric segment(s). Conversely, the time required to degrade the polymers in accordance with the present disclosure can be decreased by decreasing the hydrophobicity of the polymer, for instance, (a) by decreasing the number of lipophilic hydrocarbon segments in the polymer, (b) by decreasing the number of carbons in the lipophilic hydrocarbon segment(s), (c) by increasing the number of biodegradable polymeric segments in the polymer, and/or (d) by increasing the number of monomer units in the biodegradable polymeric segment(s).

One example, among many others, of an application where an increase in hydrophobicity would be useful is in the formation of a conformal coating for saccharide (e.g., mono, di, and polysaccharide) based vascular sealing anchors. Certain saccharide based anchors tend to dissolve more quickly than is ideal. To address this issue, it has been proposed to provide the anchors with a coating of polylactide. This, however, has been shown to actually result in a slight acceleration in the dissolution process. By utilizing hydrophobically modified polylactide (e.g., by employing polymers in accordance with the present disclosure), the dissolution rate may be substantially slowed. Thus, polymers in accordance with the present disclosure can be used as a coating for the anchor to prevent premature biodegradation or dissolution. The coatings may also serve as an adhesive to "bond" the anchor to a vessel wall.

In some embodiments, the polymers of the present disclosure are employed as drug releasing materials. In this regard, the drug release rate may be decreased by increasing the hydrophobicity of the polymers, while the release rate may be increased by decreasing the hydrophobicity of the polymers. A few specific examples of medical applications that may benefit from the use of polymers of the present disclosure as drug releasing materials include drug releasing coatings for stents, drug eluting balloon coatings and balloon deployable drug delivery sleeves, among many others. Further applications are discussed below.

Surprisingly, in some embodiments, the polymers of the present disclosure are able to act as contact adhesives. In this regard, it has been postulated that the contact adhesive properties of the polymers can be increased by increasing the relative amount of the lipophilic hydrocarbon segment(s)

relative to the biodegradable polymeric segment(s), for example, by increasing the number of lipophilic hydrocarbon segments on the initiator molecule (e.g., diglyceride vs. monoglyceride), by increasing the number of carbon atoms of the lipophilic hydrocarbon segment(s), by decreasing the number of the biodegradable polymeric segment(s) and/or by decreasing the length of the biodegradable polymeric segment(s).

For example, in Example 1 below, the presence of glycerol α-monopalmitate was found to give the polymer contact adhesive properties where the two lactide arms were of lower molecular weight (approximately 10 lactic acid units in length), but not where the two lactide arms were of higher molecular weight (approximately 40 lactic acid units in length). Pure polylactide is rigid and nonadhesive in nature.

Moreover, it has been postulated that the adhesive properties of the polymers of the present disclosure may be increased by increasing the branching associated with the lipophilic hydrocarbon segments.

Specific examples of applications for such biodegradable contact adhesives include adhesives for biodegradable packaging materials (e.g., trash bags, containers for food and other products, pressure sensitive films such as food wraps, etc.), personal products (e.g., adhesives for biodegradable sanitary napkins, biodegradable diapers, etc.), biodegradable adhesive tape, biodegradable medical articles (e.g., wraps, bandages, etc.), adhesives that promote adhesion between a drug delivery matrix and a delivery device (e.g., a coated balloon, stent, etc.), adhesives that promote adhesion between bodily tissue (e.g., a body lumen such as a blood vessel, GI tract, ureter, urethra, etc.) and a drug delivery matrix (e.g., a balloon-deliverable drug delivery matrix, where the drug delivery matrix engages and adheres to a body lumen upon balloon expansion and remains in the body upon removal of the balloon), and so forth.

In certain embodiments, a hard biodegradable polymeric segment (e.g., a polylactide segment, among others) is employed in the polymers of the present disclosure, in which case the presence of the lipophilic hydrocarbon segment may be advantageous in improving the flexibility of the polymer. One specific example of an article where such a polymer may be employed, among many others, is a metallic vascular stent with a polymeric coating, in which case it is desirable to expand the stent without cracking the coating.

In further embodiments, the polymers of the present disclosure maybe used, for example, as tie layers for medical devices (e.g., as tie layers for drug eluting stents), for example, where a coating does not have sufficient adhesive strength, and as hemostatic patch adhesives wherein the polymers are used to bond a backing material to a hemostatic patch.

As is apparent from the foregoing, a wide variety of medical and non-medical articles may be formed using polymers in accordance with the present disclosure. For example, such articles may contain one or more polymeric regions that contain one or more polymers in accordance with the present disclosure as described above. As used herein, a "polymeric region" is a region (e.g., an entire article, an article component, an article coating layer, etc.) that contains polymers, for example, from 50 wt % or less to 75 wt % to 90 wt % to 95 wt % to 97.5 wt % to 99 wt % or more polymers. Layers can be provided over an underlying article at a variety of locations and in a variety of shapes (e.g., in the form of a series of rectangles, stripes, or any other continuous or non-continuous pattern). As used herein a "layer" of a given material is a region of that material whose thickness is small compared to both its length and width. As used herein a layer need not be planar, for example, taking on the contours of an underlying substrate. Layers can be discontinuous (e.g., patterned).

In addition to one or more polymers in accordance with the present disclosure as described above, polymeric regions may optionally contain one or more supplemental materials. Typical amounts of such supplemental materials may constitute, independently, for example, from 1 wt % or less to 2 wt % to 5 wt % to 10 wt % to 25 wt % to 50% or more of the polymeric regions. For example, in some embodiments, one or more polymers in accordance with the present disclosure may be combined with one or more supplemental materials, for example, one or more supplemental biodegradable polymers, one or more plasticizers, one or more therapeutic agents, and so forth.

Examples of supplemental biodegradable polymers for use in the present disclosure may be selected from suitable members of the following, among others: (a) biodegradable polyesters, including homopolymer and copolymers comprising one or more monomers selected from hydroxyacids (e.g., glycolic acid, D-lactic acid, L-lactic acid, beta-hydroxybutyric acid, beta-hydroxyvaleric acid, beta-malic acid, D-gluconic acid, L-gluconic acid, etc.), lactones (e.g., epsilon-caprolactone, delta-valerolactone, etc.), p-dioxanones (resulting in the formation of polyether esters), for example, selected from the following: polyglycolide, poly-L-lactide (PLLA), poly-D-lactide, poly-D,L-lactide, poly(beta-hydroxybutyrate), poly-D-gluconate, poly-L-gluconate, poly-D,L-gluconate, poly(epsilon-caprolactone), poly(delta-valerolactone), poly(p-dioxanone), poly(lactide-co-glycolide) (PLGA), poly(lactide-co-delta-valerolactone), poly(lactide-co-epsilon-caprolactone), poly(lactide-co-beta-malic acid), and poly(beta-hydroxybutyrate-co-beta-hydroxyvalerate), among others, (b) biodegradable polycarbonates, including homopolymers and copolymers comprising one or more carbonate monomers selected from trimethylene carbonate, tetramethylene carbonate, 2,2-dimethyltrimethylene carbonate, etc., for example, selected from the following: poly(trimethylene carbonate), poly(tetramethylene carbonate), poly(2,2-dimethyltrimethylene carbonate), poly(lactide-co-trimethylene carbonate) and poly(glycolide-co-trimethylene carbonate), among others, (c) polyorthoesters, (d) polyanhydrides, (e) poly(phosphazine)s, and (f) poly(amino acid)s, including homopolymer and copolymers comprising naturally occurring amino acids as well as synthetic amino acid sequences, for example, polymers comprising dimers based on a deaminated hydroxyl amino acid and an alkyl or aromatic ester of a hydroxyl amino acid, particularly desamino-tyrosyl-tyrosine alkyl and aromatic esters, among other possibilities.

To improve association between polymers, in certain embodiments, it is preferred in some embodiments to match the monomers of the supplemental biodegradable polymer with the monomers of the biodegradable polymeric segment(s) of the polymer of the present disclosure. For instance, where the polymer of the present disclosure is provided with one or more biodegradable polylactide segments, it may be desirable to select polylactide as a supplemental biodegradable polymer or where the polymer of the present disclosure is provided with one or more biodegradable poly (lactide-co-glycolide) segments, it may be desirable to select poly(lactide-co-glycolide) as a supplemental biodegradable polymer. Blending such supplemental biodegradable polymers provides, for example, further control over the hydrophobicity of the polymeric regions that contain the same.

Examples of plasticizers include, for example, glycerol, triacetyl glycerin, ethylene glycol, triethylene glycol, polyethylene glycol, propylene glycol, polyalkylene oxides (e.g., polyethylene oxide and copolymers of polyethylene oxide and polypropylene oxide), citric acid esters, sebacic acid esters, phthalic acid esters, and silicone fluid.

"Drugs," "therapeutic agents," "pharmaceutically active agents," "pharmaceutically active materials," and other related terms may be used interchangeably herein. A wide variety of therapeutic agents can be employed in conjunction with the present disclosure including those used for the treatment of a wide variety of diseases and conditions (i.e., the prevention of a disease or condition, the reduction or elimination of symptoms associated with a disease or condition, or the substantial or complete elimination of a disease or condition).

Exemplary therapeutic agents for use in conjunction with the present disclosure include the following: (a) anti-thrombotic agents such as heparin, heparin derivatives, urokinase, clopidogrel, and PPack (dextrophenylalanine proline arginine chloromethylketone); (b) anti-inflammatory agents such as dexamethasone, prednisolone, corticosterone, budesonide, estrogen, sulfasalazine and mesalamine; (c) antineoplastic/antiproliferative/anti-miotic agents such as paclitaxel, 5-fluorouracil, cisplatin, vinblastine, vincristine, epothilones, endostatin, angiostatin, angiopeptin, monoclonal antibodies capable of blocking smooth muscle cell proliferation, and thymidine kinase inhibitors; (d) anesthetic agents such as lidocaine, bupivacaine and ropivacaine; (e) anti-coagulants such as D-Phe-Pro-Arg chloromethyl ketone, an RGD peptide-containing compound, heparin, hirudin, antithrombin compounds, platelet receptor antagonists, anti-thrombin antibodies, anti-platelet receptor antibodies, aspirin, prostaglandin inhibitors, platelet inhibitors and tick antiplatelet peptides; (f) vascular cell growth promoters such as growth factors, transcriptional activators, and translational promotors; (g) vascular cell growth inhibitors such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin; (h) protein kinase and tyrosine kinase inhibitors (e.g., tyrphostins, genistein, quinoxalines); (i) prostacyclin analogs; (j) cholesterol-lowering agents; (k) angiopoietins; (l) antimicrobial agents such as triclosan, cephalosporins, aminoglycosides and nitrofurantoin; (m) cytotoxic agents, cytostatic agents and cell proliferation affectors; (n) vasodilating agents; (o) agents that interfere with endogenous vasoactive mechanisms; (p) inhibitors of leukocyte recruitment, such as monoclonal antibodies; (q) cytokines; (r) hormones; (s) inhibitors of HSP 90 protein (i.e., Heat Shock Protein, which is a molecular chaperone or housekeeping protein and is needed for the stability and function of other client proteins/signal transduction proteins responsible for growth and survival of cells) including geldanamycin, (t) alpha receptor antagonist (such as doxazosin, Tamsulosin) and beta receptor agonists (such as dobutamine, salmeterol), beta receptor antagonist (such as atenolol, metaprolol, butoxamine), angiotensin-II receptor antagonists (such as losartan, valsartan, irbesartan, candesartan and telmisartan), and antispasmodic drugs (such as oxybutynin chloride, flavoxate, tolterodine, hyoscyamine sulfate, diclomine) (u) bARKct inhibitors, (v) phospholamban inhibitors, (w) Serca 2 gene/protein, (x) immune response modifiers including aminoquizolines, for instance, imidazoquinolines such as resiquimod and imiquimod, (y) human apolioproteins (e.g., AI, AII, AIII, AIV, AV, etc.), (z) selective estrogen receptor modulators (SERMs) such as raloxifene, lasofoxifene, arzoxifene, miproxifene, ospemifene, PKS 3741, MF 101 and SR 16234, (aa) PPAR agonists, including PPAR-alpha, gamma and delta agonists, such as rosiglitazone, pioglitazone, netoglitazone, fenofibrate, bexaotene, metaglidasen, rivoglitazone and tesaglitazar, (bb) prostaglandin E agonists, including PGE2 agonists, such as alprostadil or ONO 8815Ly, (cc) thrombin receptor activating peptide (TRAP), (dd) vasopeptidase inhibitors including benazepril, fosinopril, lisinopril, quinapril, ramipril, imidapril, delapril, moexipril and spirapril, (ee) thymosin beta 4, (ff) phosphohydrocarbons including phosphorylcholine, phosphatidylinositol and phosphatidylcholine, (gg) VLA-4 antagonists and VCAM-1 antagonists, (hh) non-fouling, protein resistant agents such as polyethyelene glycol and (ii) prohealing agents.

Numerous therapeutic agents, not necessarily exclusive of those listed above, have been identified as candidates for vascular treatment regimens, for example, as agents targeting restenosis (antirestenotics). Such agents are useful for the practice of the present disclosure and include one or more of the following: (a) Ca-channel blockers including benzothiazapines such as diltiazem and clentiazem, dihydropyridines such as nifedipine, amlodipine and nicardapine, and phenylalkylamines such as verapamil, (b) serotonin pathway modulators including: 5-HT antagonists such as ketanserin and naftidrofuryl, as well as 5-HT uptake inhibitors such as fluoxetine, (c) cyclic nucleotide pathway agents including phosphodiesterase inhibitors such as cilostazole and dipyridamole, adenylate/Guanylate cyclase stimulants such as forskolin, as well as adenosine analogs, (d) catecholamine modulators including α-antagonists such as prazosin and bunazosine, β-antagonists such as propranolol and α/β-antagonists such as labetalol and carvedilol, (e) endothelin receptor antagonists such as bosentan, sitaxsentan sodium, atrasentan, endonentan, (f) nitric oxide donors/releasing molecules including organic nitrates/nitrites such as nitroglycerin, isosorbide dinitrate and amyl nitrite, inorganic nitroso compounds such as sodium nitroprusside, sydnonimines such as molsidomine and linsidomine, nonoates such as diazenium diolates and NO adducts of alkanediamines, S-nitroso compounds including low molecular weight compounds (e.g., S-nitroso derivatives of captopril, glutathione and N-acetyl penicillamine) and high molecular weight compounds (e.g., S-nitroso derivatives of proteins, peptides, oligosaccharides, polysaccharides, synthetic polymers/oligomers and natural polymers/oligomers), as well as C-nitroso-compounds, O-nitroso-compounds, N-nitroso-compounds and L-arginine, (g) Angiotensin Converting Enzyme (ACE) inhibitors such as cilazapril, fosinopril and enalapril, (h) ATII-receptor antagonists such as saralasin and losartin, (i) platelet adhesion inhibitors such as albumin and polyethylene oxide, (j) platelet aggregation inhibitors including cilostazole, aspirin and thienopyridine (ticlopidine, clopidogrel) and GP IIb/IIIa inhibitors such as abciximab, epitifibatide and tirofiban, (k) coagulation pathway modulators including heparinoids such as heparin, low molecular weight heparin, dextran sulfate and β-cyclodextrin tetradecasulfate, thrombin inhibitors such as hirudin, hirulog, PPACK(D-phe-L-propyl-L-arg-chloromethylketone) and argatroban, FXa inhibitors such as antistatin and TAP (tick anticoagulant peptide), Vitamin K inhibitors such as warfarin, as well as activated protein C, (l) cyclooxygenase pathway inhibitors such as aspirin, ibuprofen, flurbiprofen, indomethacin and sulfinpyrazone, (m) natural and synthetic corticosteroids such as dexamethasone, prednisolone, methprednisolone and hydrocortisone, (n) lipoxygenase pathway inhibitors such as nordihydroguairetic acid and caffeic acid, (o) leukotriene receptor antagonists, (p) antagonists of E- and P-selectins, (q) inhibitors of VCAM-1 and ICAM-1 interactions, (r) prostaglandins and analogs thereof including prostaglandins such as PGE1 and PGI2 and prostacyclin analogs such as ciprostene, epoprostenol, carbacyclin, iloprost and beraprost, (s) macrophage activation preventers including bisphosphonates, (t) HMG-CoA reductase inhibitors such as lovastatin, pravastatin, atorvastatin, fluvastatin, simvastatin and cerivastatin, (u) fish oils and omega-3-fatty acids, (v) free-radical scavengers/antioxidants such as probucol, vitamins C and E, ebselen, trans-retinoic acid SOD (orgotein) and SOD mimics, verteporfin, rostaporfin, AGI 1067, and M40419, (w) agents affecting various growth factors including FGF pathway agents such as bFGF antibodies and chimeric fusion proteins, PDGF receptor antagonists such as trapidil, IGF pathway agents including somatostatin analogs such as angiopeptin and ocreotide, TGF-β pathway agents such as polyanionic agents (heparin, fucoidin), decorin, and TGF-β antibodies, EGF pathway agents such as EGF antibodies, receptor antagonists and chimeric fusion proteins, TNF-α pathway agents such as thalidomide and analogs thereof, Thromboxane A2 (TXA2) pathway modulators such as sulotroban, vapiprost, dazoxiben and ridogrel, as well as protein tyrosine kinase inhibitors such as tyrphostin, genistein and quinoxaline derivatives, (x) matrix metalloprotease (MMP) pathway inhibitors such as marimastat, ilomastat, metastat, batimastat, pentosan polysulfate, rebimastat, incyclinide, apratastat, PG 116800, RO 1130830 or ABT 518, (y) cell motility inhibitors such as cytochalasin B, (z) antiproliferative/antineoplastic agents including antimetabolites such as purine analogs (e.g., 6-mercaptopurine or cladribine, which is a chlorinated purine nucleoside analog), pyrimidine analogs (e.g., cytarabine and 5-fluorouracil) and methotrexate, nitrogen mustards, alkyl sulfonates, ethylenimines, antibiotics (e.g., daunorubicin, doxorubicin), nitrosoureas, cisplatin, agents affecting microtubule dynamics (e.g., vinblastine, vincristine, colchicine, Epo D, paclitaxel and epothilone), caspase activators, proteasome inhibitors, angiogenesis inhibitors (e.g., endostatin, angiostatin and squalamine), olimus family drugs (e.g., sirolimus, everolimus, biolimus, tacrolimus, zotarolimus, etc.), cerivastatin, flavopiridol and suramin, (aa) matrix deposition/organization pathway inhibitors such as halofuginone or other quinazolinone derivatives, pirfenidone and tranilast, (bb) endothelialization facilitators such as VEGF and RGD peptide, (cc) blood rheology modulators such as pentoxifylline and (dd) glucose cross-link breakers such as alagebrium chloride (ALT-711).

As an alternative to (or in addition to) blending, one or more therapeutic agents may be included beneath polymeric regions in accordance with the present disclosure (in which case the polymeric regions may function as barrier layers to slow release) or attached to (e.g., covalently or non-covalently bound to) such polymeric regions.

Polymers in accordance with the present disclosure may be used in the formation of a variety of medical and non-medical articles, several of which are described above.

Examples of medical articles include pharmaceutical compositions, for example, transdermal drug delivery patches, bandages, wound dressings, powders, granules, solutions, dispersions, emulsions, sprays, aerosols, ointments, gels, creams, drops, tablets, pills, capsules, and so forth.

Examples of medical articles further include implantable or insertable medical devices, for example, stents (including coronary vascular stents, peripheral vascular stents, cerebral, urethral, ureteral, biliary, tracheal, gastrointestinal and esophageal stents), stent coverings, stent grafts, vascular grafts, abdominal aortic aneurysm (AAA) devices (e.g., AAA stents, AAA grafts, etc.), vascular access ports, dialysis ports, catheters (e.g., urological catheters or vascular catheters such as balloon catheters and various central venous catheters), guide wires, balloons, filters (e.g., vena cava filters and mesh filters for distal protection devices), embolization devices including cerebral aneurysm filler coils (including Guglielmi detachable coils and metal coils), embolic agents, tissue bulking devices, septal defect closure devices, drug depots that are adapted for placement in an artery for treatment of the portion of the artery distal to the device, myocardial plugs, patches, leads including pacemaker leads, defibrillation leads and coils; neurostimulation leads such as spinal cord stimulation leads, deep brain stimulation leads, peripheral nerve stimulation leads, cochlear implant leads and retinal implant leads, pulse generators, ventricular assist devices including left ventricular assist hearts and pumps, total artificial hearts, shunts, valves including heart valves and vascular valves, anastomosis clips and rings, hemostatic devices including vascular sealing anchors, cochlear implants, tympanostomy tubes, thoracic drainage tubes, nephrostomy tubes, and tissue engineering scaffolds for cartilage, bone, skin, nerve (e.g., for neural pathway regeneration, including the spinal cord,), and other in vivo tissue regeneration, sutures, suture anchors, tissue staples and ligating clips at surgical sites, cannulae, metal wire ligatures, urethral slings, hernia "meshes", artificial ligaments, tacks for ligament attachment and meniscal repair, joint prostheses, spinal discs and nuclei, orthopedic prosthesis such as bone grafts, bone plates, fins and fusion devices, orthopedic fixation devices such as interference screws in the ankle, knee, and hand areas, rods and pins for fracture fixation, screws and plates for craniomaxillofacial repair, dental implants, contact lenses, interocular lenses, punctum plugs, glaucoma shunts, or other devices that are implanted or inserted into the body. As previously indicated, in some embodiments, the polymeric regions of the present disclosure correspond to an entire medical device. In other embodiments, the polymeric regions correspond to one or more portions of a medical device. For instance, the polymeric regions can be in the form of medical device components, in the form of one or more fibers which are incorporated into or onto a medical device, in the form of one or more polymeric layers formed over all or only a portion of an underlying substrate, and so forth. Materials for use as underlying medical device substrates include ceramic, metallic and polymeric substrates, which may be biodegradable or biostable.

Numerous techniques are available for forming polymeric regions in accordance with the present disclosure.

For example, where the polymers of the present disclosure have thermoplastic characteristics, a variety of thermoplastic processing techniques may be used to form polymeric regions from the same. Using these techniques, a polymeric region can be formed, for instance, by (a) first providing a melt that contains polymer(s) and any optional supplemental materials (e.g., one or more supplemental biodegradable polymers, plasticizers, therapeutic agents, etc.) and (b) subsequently cooling the melt. Examples of thermoplastic processing techniques include compression molding, injection molding, blow molding, spraying, vacuum forming and calendaring, extrusion into sheets, fibers, rods, tubes and other cross-sectional profiles of various lengths, and combinations of these processes. Using these and other thermoplastic processing techniques, entire articles or portions thereof can be made.

Other processing techniques besides thermoplastic processing techniques may also be used to form polymeric regions in accordance with the present disclosure, including solvent-based techniques. Using these techniques, polymeric regions can be formed, for instance, by (a) first providing a solution or dispersion that contains polymer(s) and any optional supplemental materials and (b) subsequently removing the solvent. The solvent that is ultimately selected will contain one or more solvent species, which are generally selected based on their ability to dissolve the polymer(s) that form the polymeric region, in addition to other factors, including drying rate, surface tension, etc. In certain embodiments, the solvent is selected based on its ability to dissolve or disperse optional supplemental materials, if any. Preferred solvent-based techniques include, but are not limited to, solvent casting techniques, spin coating techniques, web coating techniques, spraying techniques, dipping techniques, techniques involving coating via mechanical suspension including air suspension, ink jet techniques, electrostatic techniques, and combinations of these processes.

In some embodiments of the present disclosure, a polymer containing solution (where solvent-based processing is employed) or a polymer containing melt (where thermoplastic processing is employed) is applied to a substrate to form a polymeric region. For example, the substrate can correspond to all or a portion of a medical or non-medical article to which a polymeric coating is applied, for example, by spraying, extrusion, and so forth. The substrate can also be, for example, a template, such as a mold, from which the polymeric region is removed after solidification. In other embodiments, for example, extrusion and co-extrusion techniques, one or more polymeric regions are formed without the aid of a substrate. In a specific example, an entire article is extruded. In another example, a polymeric coating layer is co-extruded along with and underlying article body. In another example, a polymeric region is extruded which is then assembled over an article body.

In one specific embodiment, polymeric regions in accordance with the present disclosure can be in the form of spun nanofibers (diameter less than 1000 nm) or microfibers (diameter ranging from 1 μm to 100 μm). Such fibers may be formed, for example, via thermoplastic (e.g., melt spinning) processing or via solvent-based (e.g., dry spinning) processes. Such fibers may, serve, for example, as a stent coating, as a component of a stent-less delivery device (e.g., a balloon-deliverable fibrous sleeve) or a vascular scaffolding device component, among others.

EXAMPLES

Below are examples of specific embodiments for carrying out the present disclosure. The examples are offered for illustrative purposes only, and are not intended to limit the scope of the present disclosure in any way.

Example 1

Procedure for the Polymerization of Lactide Using Glycerol α-Monopalmitate as an Initiator Reagents used in this procedure are set forth in Table 1 below.

TABLE 1

| Reagents. | | | | | | | |
|---|---|---|---|---|---|---|---|
| Compound | Source | CAS No. | Mol. Wt. | Amount | mmol | Equiv. | Density |
| glycerol α-monopalmitate | TCI | 542-44-9 | 330.5 | 5.0 g | 15.13 | 1.0 | N/A |
| lactide | Aldrich | 4511-42-6 | 144.13 | 10.9 g | 75.65 | 5.0 | N/A |
| Tin(II) 2-ethylhexanoate | Aldrich | 301-10-0 | 405.11 | 306 mg/ 245 μL | 0.757 | 0.05 | 1.251 g/mL |

To a flame-dried 100 mL conical round bottom flask was added 5.0 g glycerol α-monopalmitate and 10.9 g lactide. The two solids were mixed well by adding 50 mL tetrahydrofuran (THF) to dissolve them. 245 μL of tin(II) 2-ethylhexanoate were then added to the flask via syringe and the THF was then removed by rotary evaporation, giving a homogeneous mixture and ensuring a homogeneous polymerization from the melt. The round bottom flask was capped with a rubber septum and put under $N_2$ pressure (1-5 atm), specifically, a firestone valve was used to purge the air out and back fill with $N_2$. The flask was heated to 140° C. for ~6 hrs in an oil bath using a temperature probe (J-KEM Scientific). After 6 hours the heat was removed and the reaction mixture was allowed to stand at room temperature overnight.

The cooled reaction mixture was a homogeneous white solid. The white solid was washed with ~25 mL of diethyl ether. The solution became cloudy and was filtered by suction on a size D fritted funnel. (Note: The diethyl ether wash tends to clog the fritted funnel. Because the usable solid obtained from filtering came from the filtrate, however, the ether washes may be dripped directly into cold petroleum ether in the future, rather than filtered, if desired.) The remaining solid was scraped out and washed with another 25 mL of ether. (Note: The homogeneous white solid is very difficult to break up and scrape out of the flask. In fact, the round bottom ended up breaking. To avoid this, the reaction may be carried out in a vial. After the solid has formed, the vial may be dipped into liquid $N_2$ contracting the polymer and pulling it off the glass. The vial may then be broken and the solid worked up. See *J. Organometallic Chem.* 690 (2005) 5881-5891.) The undissolved solid, which was relatively rigid in character, was dried over suction and massed (6.3 g). The diethyl ether filtrate was then slowly dripped into ~400 mL of ice-cold petroleum ether. A white solid precipitated out of solution and was allowed to settle to the bottom. The petroleum ether was decanted away and the residual solvent was evaporated with a stream of $N_2$. The remaining opaque, sticky solid (this solid is non-adhesive until pressure is applied at which point it becomes sticky) was massed (3.5 g). Theoretical yield was 15.9 g. Actual yield was 9.8 g (6.3 g+3.5 g) or 62%.

The more rigid solid was analyzed using $^1$H- and $^{13}$C-NMR. Integration of proton NMR peaks suggested a polymer with a MW around 7,000 (corresponding to biodegradable polymeric segments of approximately 70 lactic acid units in length). The sticky solid was also analyzed using $^1$H- and $^{13}$C-NMR. Integration of proton NMR peaks suggested a polymer with a MW around 1000 corresponding to biodegradable polymeric segments of approximately 10 lactic acid units in length. These findings were also supported by GPC. A calibration curve was developed on the GPC using six low molecular weight polystyrene standards. The two polymers were then run and fit to this curve. By GPC the rigid polymer was ~7,000 and the sticky polymer was ~1,500.

Example 2

Procedure for the Polymerization of Lactide Using Glycerol α,α-Dilaurate as an Initiator Reagents used in this procedure are set forth in Table 2 below.

TABLE 2

Reagents.

| Compound | Source | CAS | MW | Amt. | mmol | Eq. | Density |
|---|---|---|---|---|---|---|---|
| glycerol α,α-dilaurate | TCI | 539-93-5 | 456.71 | 8.0 g | 17.52 | 1.0 | N/A |
| lactide | Aldrich | 4511-42-6 | 144.13 | 12.6 g | 87.6 | 5.0 | N/A |
| Tin(II) 2-ethylhexanoate | Aldrich | 301-10-0 | 405.11 | 355 mg/ 284 μL | 0.876 | 0.05 | 1.251 g/mL |

To a 250 ml round bottom flask was added 8.0 g of glycerol α,α-dilaurate, 12.6 g of lactide and ~150 ml of THF. The flask was swirled until all solids dissolved and then rotovapped to yield a homogeneous mixture of the two solids. Solids were transferred to a glass vial and 284 μL (355 mg) of tin(II)-2-ethylhexanoate were added. The vial was capped with a screw top and placed in an oil bath @ 140° C. for ~5 hours. The heat was then removed and the reaction mixture was allowed to sit over the weekend.

A sticky amber product was dissolved in diethyl ether and poured into ~450 ml of cold petroleum ether. A white precipitate formed and settled to the bottom. Solvent was decanted away and dried with a stream of compressed air, then left overnight to dry. NMR spectra showed a polymer of approximately 10 lactide units in length (MW~1000).

Example 3

Procedure for the Polymerization of Lactide Using Isostearyl Alcohol FO-180 as an Initiator Reagents used in this procedure are set forth in Table 3 below.

TABLE 3

Reagents.

| Compound | Source | CAS No. | Mol. Wt. | Amount | Mmol | Equiv. | Density |
|---|---|---|---|---|---|---|---|
| Isostearyl alcohol FO-180N | Nissan Chemical | — | 270.49 | 10.0 g | 37.0 | 1.0 | N/A |
| Lactide | Aldrich | 4511-42-6 | 144.13 | 26.64 g | 184.85 | 5.0 | N/A |
| Tin(II) 2-ethylhexanoate | Aldrich | 301-10-0 | 405.11 | 0.749 g | 1.85 | 0.05 | 1.251 g/mL |

To a flame-dried 250 mL round bottom flask was added the FO-180 and the lactide. The two solids were mixed well by adding 125 mL tetrahydrofuran (THF) to dissolve them. Then the tin(II) 2-ethylhexanoate was added to the flask via syringe and the THF was then removed by rotary evaporation, giving a homogeneous mixture and ensuring a homogeneous polymerization from the melt. The round bottom flask was purged with $N_2$, capped with a rubber septum, and heated to 140° C. for ~2 hrs in an oil bath using a temperature probe. The heat was then removed and the reaction mixture was allowed to stand at room temperature overnight.

After cooling, diethyl ether was added to the flask in an attempt to dissolve the starting materials. The solution was very thick, however, and only the material on the surface dissolved into the diethyl ether. This solution was poured into cold pet ether. After settling, a white cloudy precipitate formed on the bottom. This material was filtered overnight.

A sticky material remained in the round bottom flask after the above procedure, which was scraped out and dried.

More diethyl ether was added to the original round bottom flask and left overnight for dissolution. The flask contents which contained dissolved and undissolved material were filtered in vacuo, leaving behind a white sticky material which was collected analyzed under $^1$H-NMR, which showed a polymer of approximately 8 lactide units in length. This fraction was tested in Example 4 below.

The remaining filtrate from the above step was filtered with fluted filter paper overnight. Sticky residue was collected.

Example 4

Adhesion Evaluation 10 wt % solution in THF of each of the following was knife coated (5 mil gap) onto stainless steel foil and dried at 100° C. in a convection oven for 30 minutes to form a primer layer: (a) the sticky solid from the glycerol α-monopalmitate based polymer in Example 1, (b) the sticky solid from the glycerol dilaurate based polymer in Example 2, and (c) the sticky solid from the FO-180 based polymer in Example 3.

A 30 wt % solution of PLGA 85/15 (Lakeshore Biomaterials) in 1:1 (wt:wt) THF:DMF was knifed coated (15 mil gap) onto each of the preceding primer layers and dried at 100° C. in a convection oven for 60 minutes, followed by drying overnight at 70° C. under vacuum. A control was also performed with no primer layer.

Adhesion was determined by peeling the coating from the foil (180° peel angle) utilizing a tensile tester. The PLGA is coated beyond the primer layer, so that at least a portion of the PLGA coating is deposited directly onto the stainless steel, to which it has poor adhesion. This allows one to start the peel process from the stainless steel. During the peel test, the peel front reaches the primer layer, at which point one measures the adhesion-promoting capability of the layer.

Peel adhesion as measured by the tensile tester is shown in the following Table 4.

TABLE 4

| Specimen # | Specimen description | Width (inches) | Adhesion (gf) | Adhesion/Width (gf/in) |
|---|---|---|---|---|
| 1 | Control, PLGA 85/15 dry, no primer | 0.2 | 224.253 | 1121.265 |
| 2 | Control, PLGA 85/15 dry, no primer | 0.2 | 287.153 | 1435.765 |
| 3 | Control, PLGA 85/15 dry, no primer | 0.2 | 288.405 | 1442.025 |
| 4 | Control, PLGA 85/15 dry, no primer | 0.2 | 236.839 | 1184.195 |
| 5 | Control, PLGA 85/15 dry, no primer | 0.2 | 167.7 | 838.5 |
| | | | average | 1204.35 |
| | | | Stdev | 250.60 |
| | | | RSD | 20.81 |
| 6 | Lactide w/monopalmitate overcoat with PLGA 85/15 | 0.2 | 222.96 | 1114.8 |
| 7 | Lactide w/monopalmitate overcoat with PLGA 85/15 | 0.2 | 183.761 | 918.805 |
| 8 | Lactide w/monopalmitate overcoat with PLGA 85/15 | 0.2 | 221.503 | 1107.515 |
| 9 | Lactide w/monopalmitate overcoat with PLGA 85/15 | 0.2 | 261.993 | 1309.965 |
| 10 | Lactide w/monopalmitate overcoat with PLGA 85/15 | 0.2 | 246.692 | 1233.46 |
| | | | average | 1136.91 |
| | | | Stdev | 148.49 |
| | | | RSD | 13.06 |
| 11 | Lactide w dilaurate overcoat with PLGA 85/15 [peeled between layers] | 0.2 | 240.387 | 1201.935 |
| 12 | Lactide w dilaurate overcoat with PLGA 85/15 | 0.2 | 250.599 | 1252.995 |
| 13 | Lactide w dilaurate overcoat with PLGA 85/15 | 0.2 | 268.097 | 1340.485 |
| 14 | Lactide w dilaurate overcoat with PLGA 85/15 | 0.2 | 242.687 | 1213.435 |
| 15 | Lactide w dilaurate overcoat with PLGA 85/15 | 0.2 | 269.096 | 1345.48 |
| | | | average | 1270.87 |
| | | | Stdev | 68.53 |
| | | | RSD | 5.39 |
| 16 | ISO stearyl alcohol overcoat with PLGA 85/15 | 0.2 | 346.824 | 1734.12 |
| 17 | ISO stearyl alcohol overcoat with PLGA 85/15 [peeled then broke] | 0.2 | 321.511 | 1607.555 |
| 18 | ISO stearyl alcohol overcoat with PLGA 85/15 [peeled then broke] | 0.2 | 316.106 | 1580.53 |
| 19 | ISO stearyl alcohol overcoat with PLGA 85/15 [peeled then broke] | 0.2 | 315.178 | 1575.89 |
| 20 | ISO stearyl alcohol overcoat with PLGA 85/15 [peeled then broke] | 0.2 | 283.86 | 1419.3 |
| | | | average | 1583.48 |
| | | | Stdev | 112.13 |
| | | | RSD | 7.08 |

Although various embodiments are specifically illustrated and described herein, it will be appreciated that modifications and variations of the present disclosure are covered by the above teachings and are within the purview of the appended claims without departing from the spirit and intended scope of the present disclosure.

The invention claimed is:

1. A medical article comprising a polymeric region that comprises a polymer comprising a lipophilic hydrocarbon segment that comprises a pendant hydrocarbon group and a biodegradable polymeric segment that comprises between 2 and 20 monomer units, wherein said polymeric region is a biodegradable contact adhesive and wherein the lipophilic hydrocarbon segment comprises between 10 and 30 carbons.

2. The medical article of claim 1, wherein the polymer comprises a plurality of lipophilic hydrocarbon segments.

3. The medical article of claim 1, wherein the polymer comprises a residue selected from a branched fatty alcohol residue and a branched fatty acid residue.

4. The medical article of claim 1, wherein the polymer comprises a plurality of biodegradable polymeric segments.

5. The medical article of claim 1, wherein the biodegradable polymeric segment is a homopolymeric or copolymeric segment selected from a polyester segment, a polycarbonate segment and a poly(ester-co-carbonate) segment.

6. The medical article of claim 1, wherein the biodegradable polymeric segment is a homopolymeric or copolymeric segment that comprises a monomer selected from lactic acid, glycolic acid, epsilon-caprolactone, trimethylene carbonate, and combinations thereof.

7. A medical article comprising a polymeric region that comprises a polymer comprising a lipophilic hydrocarbon segment that comprises a pendant hydrocarbon group and a biodegradable polymeric segment that comprises between 2 and 20 monomer units, wherein said polymeric region is a biodegradable contact adhesive and wherein the polymeric region comprises a therapeutic agent.

8. The medical article of claim 1, wherein the polymeric region comprises a supplemental biodegradable polymer.

9. The medical article of claim 8, wherein the supplemental biodegradable polymer is selected from a polyester, a polycarbonate and a poly(ester-co-carbonate).

10. The medical article of claim 1, wherein the polymeric region is in the form of a coating for said medical article.

11. The medical article of claim 1, wherein the medical article is selected from a vascular sealing anchor, a hemostatic device, a catheter, a stent, a balloon, a drug delivery sleeve, a bandage, and a drug delivery patch.

12. A medical article comprising a polymeric region that comprises a polymer comprising a lipophilic hydrocarbon segment that comprises a pendant hydrocarbon group and a biodegradable polymeric segment that comprises between 2 and 20 monomer units, wherein said polymeric region is a biodegradable contact adhesive and wherein said medical article is an implantable medical device that comprises a substrate and wherein said polymeric region is in the form of a polymeric layer that is disposed over said substrate.

13. The medical article of claim 1, wherein the lipophilic hydrocarbon segment comprises two or more pendant hydrocarbon groups.

14. The medical article of claim 1, wherein the lipophilic hydrocarbon segment comprises three or more pendant hydrocarbon groups.

15. The medical article of claim 1, wherein the polymer comprises a single biodegradable polymeric segment.

16. The medical article of claim 13, wherein said medical article comprises a substrate and wherein said polymeric region is in the form of a polymeric layer that is disposed over said substrate.

17. The medical article of claim 14, wherein said medical article comprises a substrate and wherein said polymeric region is in the form of a polymeric layer that is disposed over said substrate.

18. The medical article of claim 15, wherein said medical article comprises a substrate and wherein said polymeric region is in the form of a polymeric layer that is disposed over said substrate.

19. The medical article of claim 16, wherein the medical article is selected from a vascular sealing anchor, a hemostatic device, a catheter, a stent, a balloon, a drug delivery sleeve, a bandage, and a drug delivery patch.

20. The medical article of claim 17, wherein the medical article is selected from a vascular sealing anchor, a hemostatic device, a catheter, a stent, a balloon, a drug delivery sleeve, a bandage, and a drug delivery patch.

21. The medical article of claim 18, wherein the medical article is selected from a vascular sealing anchor, a hemostatic device, a catheter, a stent, a balloon, a drug delivery sleeve, a bandage, and a drug delivery patch.

* * * * *